Figure 1:
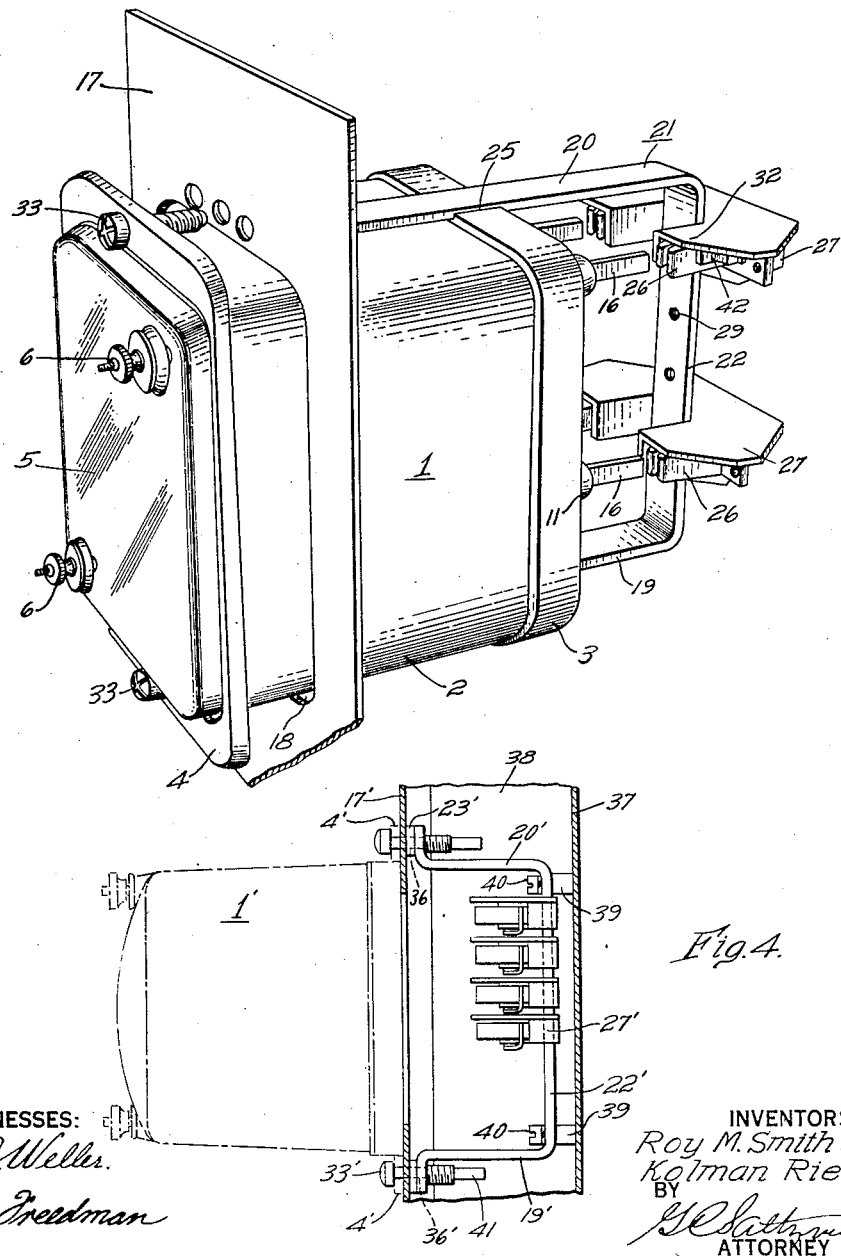

Sept. 2, 1941.  R. M. SMITH ET AL  2,254,920
ELECTRICAL INSTRUMENT
Filed Aug. 18, 1939   2 Sheets-Sheet 1

INVENTORS
Roy M. Smith and
Kolman Riesz.

Sept. 2, 1941.       R. M. SMITH ET AL       2,254,920
ELECTRICAL INSTRUMENT
Filed Aug. 18, 1939       2 Sheets-Sheet 2

WITNESSES:
C. J. Weller.
C. L. Friedman

INVENTORS
Roy M. Smith and
Kolman Riesz.
BY
ATTORNEY

Patented Sept. 2, 1941

2,254,920

UNITED STATES PATENT OFFICE 2,254,920

ELECTRICAL INSTRUMENT

Roy M. Smith, Livingston, and Kolman Riesz, Gillette, N. J., assignors to Westinghouse Electric & Manufacturing Company, East Pittsburgh, Pa., a corporation of Pennsylvania Application August 18, 1939, Serial No. 290,763

4 Claims. (Cl. 175—298)

This invention relates to electrical instruments, and it has particular relation to detachable instruments which may be readily mounted in operative position and detached therefrom.

Detachable electrical instruments have been widely accepted in certain restricted fields such as those including watthour meters and measuring instruments as exemplified by the constructions shown in the Bradshaw et al. Patent No. 1,969,499, and the Young et al. Patent No. 2,128,277. The constructions thus far employed are particularly suited for electrical instruments having a relatively light weight.

Certain advantages make the detachable construction particularly desirable for electrical instruments having large numbers of contacts, such as relays. Such instruments ordinarily are mounted on switchboards having complicated wiring extending over the rear of the switchboard panel. When relays of conventional construction are employed, the relay is connected permanently in circuit with the switchboard wiring. Consequently, to mount a standard conventional relay on a switchboard it is necessary first to attach the relay to the front of a switchboard panel. Subsequently, a workman must proceed behind the switchboard panel to connect the relay terminals to the switchboard circuits. Conversely, in order to remove the relay from the switchboard panel for servicing or replacement, it is necessary for a workman first to proceed behind the switchboard panel to disconnect the numerous relay connections to the switchboard circuits. Then the workman must return to the front of the switchboard panel in order to detach the relay therefrom. Not only does this procedure entail an objectionable amount of labor and time, but the operations carried on in the complex wiring at the rear of the switchboard are accompanied by danger to the workman and the switchboard wiring. These disadvantages are obviated by the utilization of the detachable construction for relays, but a number of problems and difficulties are presented.

Among the problems presented, by relays and a number of other electrical devices, is weight, which, in the case of protective relays, for example, is substantial and requires a sturdy support. Furthermore, such instruments often have an extremely large number of electrical contacts to be connected in the switchboard circuits; as many as twenty-three being required on a standard type of transmission line protective relay. In the detachable construction, the frictional resistance between the contact jaws carried by the switchboard and the contact blades on the instrument may reach such high value that insertion and removal of the instrument contacts are difficult. Also the necessity for placing a large number of contacts in a compact assembly renders the alignment of contacts difficult.

A still further problem is presented in certain instruments, such as relays, because of the different types of mounting encountered. For example, relays are made in both flush and projection styles. The flush relay is mounted in an opening provided in a switchboard or other panel with its cover face substantially flush with the face of the panel. On the other hand, a projection relay is mounted on a switchboard or other panel with its base substantially flush with the surface of the panel. A detachable construction should be applicable to all styles of instruments insofar as possible.

In accordance with our invention, a switchboard or other panel is provided with guide means for controlling the insertion of a detachable electrical instrument into its mounted position. This guide, in a preferred embodiment, is employed for supporting a number of fixed contacts for detachably engaging contacts carried by the electrical instrument. Additionally, the guide serves to assure proper alignment of the fixed and movable contacts as the electrical instrument is mounted on and removed from the panel. With minor modifications, the contact structure designed in accordance with our invention may be employed either for flush or for projection mounting. In order to overcome the contact resistance during insertion and removal of a detachable instrument in one specific embodiment of our invention, we provide jack-screws for forcing the detachable instrument into and out of its mounted position.

It is, therefore, an object of our invention to provide a detachable instrument assembly having means for guiding the detachable instrument into its mounted position.

It is a further object of our invention to provide a detachable instrument assembly having adequate means for supporting it during insertion, removal and operation of the instrument.

It is a further object of our invention to provide a detachable electrical instrument assembly having means for assuring alignment of the instrument contacts with fixed contacts during insertion or removal of the instrument from its mounted position.

It is another object of our invention to provide a detachable instrument construction which is suitable for both projection and flush mounting.

It is another object of our invention to provide a detachable electrical instrument assembly with means for facilitating movement of the detachable instrument into and out of its mounted position.

It is still a further object of our invention to provide a detachable instrument assembly having contact elements carried by the instrument for engagement with fixed contacts with means for applying a stress directly between the instrument structure and the holder for the fixed contacts in order to facilitate movement of the detachable instrument from and toward its mounted position.

Figure 2:
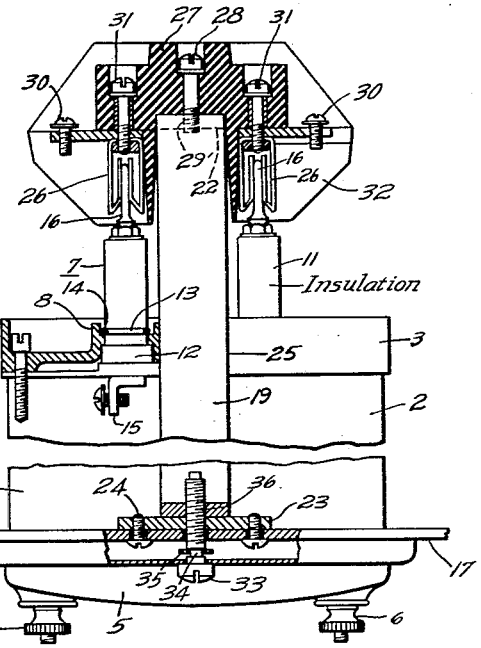
Figure 3:
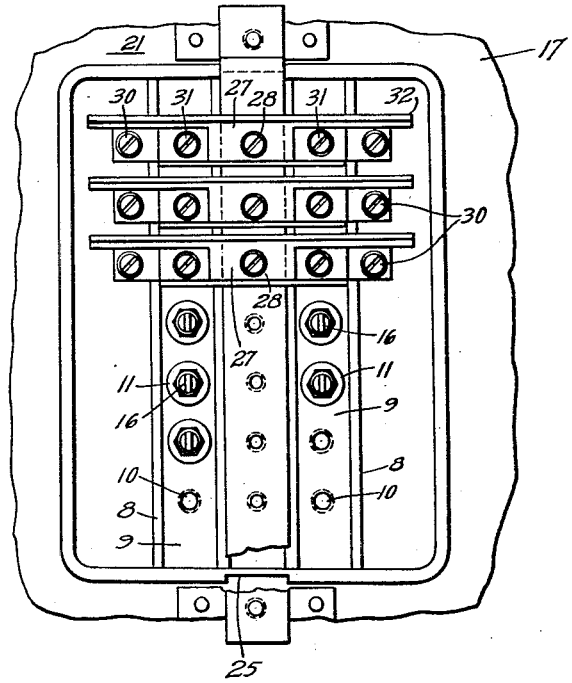

Other objects of our invention will be apparent from the following description taken in conjunction with the accompanying drawings, in which:

Figure 1 is a view in perspective of a flush type detachable instrument assembly, Fig. 2 is a view in top plan with parts in section of the detachable instrument assembly illustrated in Fig. 1, Fig. 3 is a view in rear elevation with parts broken away of a detachable instrument assembly similar to that shown in Fig. 1, and Fig. 4 is a view in side elevation, partly in section, of a projection type of detachable instrument assembly.

Referring to the drawings and particularly to Figs. 1 and 2, we have illustrated an electrical instrument casing 1 which may be of the rectangular style often employed for electrical relays. In the specific embodiment illustrated the casing comprises a wall portion 2, a rear base member 3 and a front flange member 4. These various portions may be united by means of screws, welding or other suitable attaching means or may be of integral construction. A cover 5, which may be of glass, is provided for the front of the casing and may be removably held in position by means of suitable screw means 6. The casing construction thus far described may vary appreciably in shape, materials and construction. If desired, the wall portion 2 need not be a complete enclosure but may constitute structural members extending between the base member 3 and the flange member 4. In a specific design, the base member 3 may be a metal die-casting, the wall portion 2 and the flange member 4 may be formed from thin sheet steel. This casing is intended to house an electrical instrument such as an electrical relay.

In order to establish contacts between the electrical relay and external circuits, a plurality of contact members 7 are provided at any suitable point such as the base member 3. For example, the base member may be provided with one or more pairs of ribs 8 connected at intermediate points by means of a web 9. This web is provided with a plurality of openings 10 through which the contact members 7 pass. Each contact member 7 includes an insulating cylindrical sleeve 11 having a square base portion 12. The purpose of the square base portion is to prevent rotation of the contact member in the web 9. In order to retain the contact member 7 in the web 9, the sleeve 11 may be provided with a cylindrical groove 13 adjacent the web 9. By placing a spring split-ring 14 in this groove with a portion projecting over the web 9, the contact member may be retained in its proper position on the base member 3.

Electrical current is carried through each contact member 7 by means of a conductor having at one end inside the casing a terminal 15 and at the opposite end external to the casing a contact blade 16. By attaching the circuits of a relay contained within the casing to suitable terminals 15, contacts for the relay may be established through the contact blades 16.

Ordinarily, the relay unit contained within the casing 1 is mounted on a panel 17 which may be a switchboard panel, the front of a box, the cover of a trough, or any other suitable structure. Since the casing 1 is of the flush mounted type, the panel 17 is provided with an opening 18 through which the base member 3 and the wall portion 2 may be inserted. As above noted, casings of this type and their contents often are of considerable length and of great width. As the casing is inserted in its mounted position, the portion of the casing available from the front of the panel 17 for handling may be relatively small, and it is difficult to maintain the casing and its contents in proper position. For this reason we prefer to provide a supporting element 19 for engaging a face of the relay during its insertion in order to maintain the relay and its casing in proper position. Although the one support 19 would materially assist in supporting the relay casing 1, we prefer to provide a second support 20 for engaging a second portion of the relay casing. In the specific embodiment illustrated, the supports 19 and 20 constitute two legs of a U-shaped member or bracket 21, the legs being connected together at one end by a connecting section 22. The legs 19 and 20 with the connecting section 22 thus form a U-shaped bracket which may be attached to the panel 17 in any conventional manner.

In the embodiment illustrated, the ends of the legs 19 and 20 are bent at right angles and attached in any suitable way to reinforcing straps 23 as by welding. These straps, in turn, are attached in any suitable way to the panel 17, a plurality of machine screws 24 being illustrated for this purpose. Further accuracy in guiding is provided by forming one or more grooves 25 in the base member 3 for engaging one or more of the legs 19 and 20.

Referring to Figs. 1 and 3, it will be noted that the base 3 projects somewhat from the wall portion 2. The grooves 25 extend partially through this projecting portion of the base member 3 and are proportioned to snugly but slidably receive the legs 19 or 20. In the form illustrated, two opposed grooves are provided, one for engaging each of the legs 19 and 20.

In order to connect the contact blades 16 detachably to the wiring associated with the panel 17, which may be the customary switchboard wiring, we prefer to place a plurality of contact jaws 26 in position to receive the contact blades 16 as the relay and its casing are moved into mounted position. Conveniently, these contact jaws may be mounted on the connecting section 22. As illustrated more particularly in Fig. 2, one or more contact jaws 26 may be mounted on an insulating block 27 which, in turn, is attached to the connecting section in any suitable manner, as by a machine screw 28 which is screwed into a tapped opening 29 provided in the connecting section. Each contact jaw 26 is provided with a terminal member 30, and the resulting unit may be attached to the block 27 by means of a machine screw 31. If desired, the insulating block 27 may be provided with extensions 32 which form shields around the contact jaws. A number of insulating blocks 27 each carrying one or more contact jaws may be required.

The terminal members 30 are connected permanently to the switchboard wiring and remain undisturbed no matter how often a relay and its casing is mounted on or removed from the panel 17. Although the contact members 7 and the contact jaws 26 are shown as extending along a pair of parallel straight lines, it should be noted that the number, spacing and positions may be varied as desired.

When a large number of contact blades 16 and contact jaws 26 are provided, the frictional resistance offered to attachment and detachment of the relay and its casing becomes excessive. In a detachable flush mounted relay this is particularly troublesome because of the small portion of the relay exposed from the front of the panel 17 for handling purposes. In order to facilitate attachment and detachment of the relay and its casing, we provide one or more jackscrews 33, two being illustrated at opposed points on the flange member 4. Each of these jackscrews is so mounted that it may be rotated relative to the flange member 4 but may not be moved axially relative thereto for any substantial distance. To this end, the jackscrew may be mounted in any known way on the flange member 4 as by providing the jackscrew with a groove 34 in which a collar 35 is permanently mounted. Each jackscrew is threaded in a tapped opening 36 which extends through the reinforcing strap 23 and the bent end of one of the legs of the U-shaped bracket. Preferably the screw is of such length that when the relay and its casing are inserted, the jackscrew engages in the tapped opening 36 before the contact blades 16 engage the contact jaws 26. According to the direction of rotation of the jackscrew 33, the relay and its casing 1 are forceably moved into or out of their mounted position.

It is believed that the operation of our invention is apparent from the foregoing description. When a relay and its casing 1 are to be inserted in mounted position, the base member 3 is inserted through the opening 18 and immediately engages the legs 19 and 20 of the U-shaped bracket. These legs then guide the base member 3 from a position adjacent the opening 18 to a position adjacent the contact jaws 26, and at the same time support the base member. As the contact blades 16 approach the contact jaws 26, the jackscrews 33 engage the tapped openings 36 provided in the reinforcing straps and legs 19 and 20. At this stage a screwdriver may be applied to the jackscrews 33 for rotating them in a direction such that the relay and its casing 1 are advanced into mounted position against the resistance offered by the contact jaw 26 to the contact blades 16. When the relay casing 1 is in its fully mounted position, the jackscrews 33 serve to hold it securely in this position. For removing the relay and its casing from the panel 17, a screwdriver is applied to each jackscrew 33 and rotated in a direction such that the relay casing 1 is moved away from the connecting section 22 against the resistance of the contact blades 16 and the contact jaws 26. When the screws 33 have been rotated to an extent such that they are free of the tapped openings 36, the casing 1 may be grasped manually and withdrawn from the panel 17.

It should be noted that the U-shaped bracket performs a number of distinct functions. In the first place, it serves as a guide during the insertion of the relay casing 1 in the panel 17. It also operates to support the relay casing 1 and its contents during the insertion, operation and removal thereof. Furthermore, the U-shaped bracket serves as a support for the contact jaws 26. Also, it should be noted that the stress applied by means of the jackscrews 33 is taken directly by the U-shaped bracket through the legs 19 and 20. This relieves the panel 17 of stresses that otherwise would be applied to it.

When the relay casing 1 is in its mounted position, the U-shaped bracket operating through the legs 19 and 20 and the jackscrews 33 hold the relay casing firmly in its attached position.

In those installations requiring a small number of contact blades 16 and contact jaws 26, it may be unnecessary to provide jackscrews 33 for forceably moving the relay casing 1. In such cases the collar 35 may be omitted from the jackscrew assembly or the jackscrew itself may be entirely omitted, reliance being placed on the frictional resistance offered by the contact jaw and blade assembly and the legs 19 and 20 of the U-shaped bracket for maintaining the relay casing in its mounted position.

With the construction illustrated in Figs. 1, 2 and 3, the casing 1 is supported over a considerable area. That is, support is not only afforded in the vicinity of the panel 17, but the support extends to the base member 3 which rests on the leg 19 of the U-shaped bracket. In the particular construction shown the casing 1 is supported substantially at its extreme ends, thus affording a particularly rigid support. Moreover, because of the grooves 25, it is unnecessary to mount the casing in a single position, that is, the casing of Fig. 1 could be mounted when rotated 90° from the position shown in Fig. 1, or when rotated to any other degree. In any position, complete guiding and supporting characteristics are provided by the illustrated construction.

The construction illustrated in Figs. 1, 2 and 3 may be adapted for projection type electrical instruments without substantial modification. For example, in Fig. 4, a relay casing 1' of the projection type is shown mounted on a panel 17'. This panel may correspond to the panel 17 of Fig. 1, but as illustrated in Fig. 4, the panel serves as a cover for a trough or box having a base 37 and walls 38 to which the panel 17' may be attached in any desirable manner as by machine screws or hinges (not shown). A bracket having legs 19' and 20', a connecting section 22' and reinforcing straps 23' is attached to the panel 17' and corresponds to the U-shaped bracket of Figs. 1, 2 and 3. The connecting section 22' carries one or more blocks 27' provided with contact jaws similar to those illustrated in Figs. 1, 2 and 3. Since the legs 19' and 20' do not embrace the casing proper of a projection type instrument, they may be substantially shorter than those provided for a flush mounted casing.

If further support is desired for the U-shaped bracket, pillars 39 may be attached to the box or trough box 37 and machine screws 40 employed for attaching the U-shaped bracket to the pillars 39.

When the cover or panel 17' is made removable to give access to wiring in the trough or box, the bracket may be entirely supported on the pillars 39 by means of the screws 40. That is, the straps 23' or legs 19', 20', need not be secured to the cover or panel 17'. With this arrangement the jaw assembly is held rigidly in position for wiring purposes despite the removal of the cover or panel. After completion of the wiring, the panel or cover may be mounted on the box or trough.

Although the legs 19' and 20' may be employed for guiding portions of the casing 1' in order to assure proper alignment of contacts in a manner analogous to that illustrated in Figs.

1, 2 and 3, the construction of Fig. 4 employs a modified alignment structure. The casing 1' is provided with one or more projections 4' provided with openings for receiving one or more screws 33' which correspond to the screws 33 of Figs. 1 and 2. Each screw 33' is provided with an extension 41 which is of slightly less diameter than the tapped opening provided in the reinforcing straps 23' and ends of the U-shaped bracket. Consequently, when the casing 1' is to be inserted in mounted position, it is placed over the panel 17' and advanced until the reduced extensions 41 enter the tapped openings 36' provided in the reinforcing straps 23'. The casing 1' then may be inserted further and the jackscrews 33' rotated to force the casing 1' into its mounted position. It is to be understood that the casing 1' carries contact blades corresponding to the blades 16 on the casing 1 for engaging contact jaws mounted on the contact blocks 27'. Preferably the extensions 41 are of a length such that they enter the tapped openings 36' well before the contact blades carried by the blades 16' engage the jaws engaged by the blocks 27'. It is to be understood further that the panel 17' is provided with one or more openings for receiving contact blades carried by the casing 1' but this opening or openings need not be sufficient to pass the entire casing 1'.

Numerous modifications are possible in the arrangement of the contact blades and contact jaws. In some instances it may be desired to provide auxiliary contacts for connecting certain contact jaws when a detachable instrument is removed from its mounted position. A typical installation may require such circuit completing means for short-circuiting a current transformer which normally supplied energy to the instrument contained within the casing 1. For such an installation, one or more auxiliary contacts 42 may be provided for automatically establishing the necessary circuits upon the withdrawal of the casing. This auxiliary contact may take the form disclosed in the Winter Patent No. 2,066,024. Furthermore, the contact jaw construction illustrated may include disconnect devices similar to that shown in the aforesaid Winter patent for opening predetermined circuits when desired.

It is obvious that numerous other modifications departing from the specific embodiments illustrated herein are possible. Therefore, we do not wish our invention to be restricted except as required by the appended claims when interpreted in view of the prior art.

We claim as our invention:

1. In a detachable electrical instrument installation, a panel having an opening, a detachable relay instrument having a base insertable in said opening in a predetermined direction for mounting on said panel, a U-shaped bracket positioned around the base of said instrument and having its ends extending from said panel for a substantial distance in said predetermined direction, said detachable relay instrument and said ends of said U-shaped bracket having slidably related inter-fitting male and female parts for confining movement of said relay instrument to said predetermined direction, contact means carried by said detachable relay instrument, and cooperating contact means carried by said U-shaped bracket and detachably engageable with said first-named contact means when said detachable relay instrument is in said mounted position.

2. In a detachable electrical instrument installation, a panel having an opening, a detachable relay instrument having a base insertable in said opening in a predetermined direction for mounting on said panel, a U-shaped bracket positioned around the base of said instrument and having its ends extending from said panel for a substantial distance in said predetermined direction, said detachable relay instrument and said ends of said U-shaped bracket having slidably related interfitting male and female parts for confining movement of said relay instrument to said predetermined direction, a plurality of contact members carried by said detachable relay instrument, said contact members being arranged in a predetermined pattern, and cooperating contact means for detachably engaging said contact members when said detachable relay instrument is in said mounted position, said cooperating contact means comprising a plurality of contact elements carried by said U-shaped bracket in said predetermined pattern for alignment with said contact members when said detachable relay instrument is in said mounted position.

3. In a detachable electrical instrument installation, a panel having an opening, a detachable relay instrument having a base insertable in said opening in a predetermined direction for mounting on said panel, said base having a recess extending in said predetermined direction, a U-shaped bracket positioned around the base of said instrument and having its ends extending from said panel for a substantial distance in said predetermined direction, one of said ends being slidably positioned in the recess provided in said base to form with said base slidably related interfitting male and female parts for confining movement of said relay to said predetermined direction, contact means carried by said detachable instrument, and cooperating contact means for detachably engaging said first-named contact means when said detachable instrument is in said mounted position, said cooperating contact means comprising contact elements carried by said U-shaped bracket.

4. In a detachable electrical instrument installation, a panel having an opening, a detachable relay instrument having a base insertable in said opening in a predetermined direction for mounting on said panel, a U-shaped bracket positioned around the base of said instrument and having its ends extending from said panel for a substantial distance in said predetermined direction, said detachable relay instrument and said ends of said U-shaped bracket having slidably related interfitting male and female parts for confining movement of said relay instrument to said predetermined direction, contact means carried by said detachable relay instrument, cooperating contact means carried by said U-shaped bracket and detachably engageable with said first-named contact means when said detachable relay instrument is in said mounted position, and means extending between said U-shaped bracket and said detachable relay instrument for moving said detachable relay instrument relative to said panel in said predetermined direction.

ROY M. SMITH.
KOLMAN RIESZ.